UNITED STATES PATENT OFFICE.

WILLIAM A. HALL, OF NEW YORK, N. Y., ASSIGNOR TO WILLIAM A. HALL LUMBER & FIBRE COMPANY, A CORPORATION OF VERMONT.

FIREPROOFING COMPOSITION.

1,080,966.  Specification of Letters Patent.  Patented Dec. 9, 1913.

No Drawing.   Application filed November 3, 1909.   Serial No. 526,028.

*To all whom it may concern:*

Be it known that I, WILLIAM A. HALL, a citizen of the United States, residing at New York, in the county of New York and State of New York, have invented or discovered certain new and useful Improvements in Fireproofing Compositions, of which the following is a specification.

This invention or discovery has for its object to provide a composition for fireproofing wood or other substances, and which will be of an efficient fireproofing character, while it will be neutral or alkaline, and thus avoid the objections to which acid fireproofing compositions or solutions are liable.

The fire proofing solutions now most generally in use are mixtures of phosphate of ammonia and sulfate of ammonia, both of which are salts with acid reactions. The former is used principally for its mineralizing effect on the fiber of the wood, in a way loading it up with incombustible material. The function of the sulfate of ammonia is principally for the evolution of gases which have a flame-extinguishing effect, or which do not support combustion. When the wood is exposed to a high degree of temperature in a burning building the gases evolved from the ammonium sulfate (and to some extent from the ammonium phosphate) have a tendency to extinguish the flame of any combustible gases that may be discharged from the wood.

Now I have discovered that sodium phosphate, preferably tri-sodium phosphate, and which is an alkaline salt, has substantially the same function as the ammonium phosphate in that it is a very excellent mineralizer, and has marked fireproofing characteristics of its own. Alone it is not quite as efficient as the ammonia phosphate, but is very much cheaper, and, being an alkali, it is more desirable for use in woods, as the woods are not materially injured by alkalis, whereas they are materially injured by acids which weaken the fiber. The ammonium sulfate is a salt with an acid reaction, but it can be mixed with the alkaline sodium phosphate without impairing its fireproofing characteristics, and a mixture of the two in about equal proportions will provide a fire proofing composition which will have a slightly alkaline reaction and which is of a more efficient fireproofing character than either salt alone, and which composition is fully as efficient as a mixture of ammonium phosphate and ammonium sulfate. While there is a certain reaction between these two salts the special advantages of the novel composition are in economy and in providing an alkaline fireproofing solution instead of an acid solution. Also the wood treated with this mixture may be heated in the fireproofing process without disorganizing the salts or destroying their fireproofing characteristics, whereas the acid salts lose their efficiency, to a great extent, when heated; and heating, either by steaming or boiling, is very desirable in the fireproofing process, in order to soften the wood and make it more receptive to the fireproofing solutions.

Instead of using sulfate of ammonia in the fireproofing mixture, phosphate of ammonia might be used; but owing to the much greater cost of the latter salt the former will preferably be employed. Also, instead of using phosphate of soda as an alkaline substance in the fireproofing mixture, sulfid of soda might be employed, but the former salt is much preferred owing to its greater efficiency.

Having thus described my invention or discovery I claim and desire to secure by Letters Patent:

1. A fireproofing composition consisting of a salt having fireproofing properties and having an acid reaction, and a salt having an alkaline reaction, mixed together in approximately equal proportions, resulting in an alkaline mixture.

2. A fireproofing composition consisting of sulfate of ammonia and trisodium phosphate, mixed together in approximately equal proportions, resulting in an alkaline mixture.

In testimony whereof I affix my signature, in presence of two witnesses.

WILLIAM A. HALL.

Witnesses:
 CHAS. S. HYER,
 C. M. SWEENEY.